(12) United States Patent
DeVore et al.

(10) Patent No.: US 6,939,268 B2
(45) Date of Patent: Sep. 6, 2005

(54) VEHICLE TRANSMISSION SYSTEM WITH COAST CONTROLS

(75) Inventors: James H. DeVore, Laurinburg, NC (US); Charles E. Allen, Jr., Rochester Hills, MI (US); Winfried Sturmer, Euerbach (DE); Karl-Fritz Heinzelmann, Meckenbeuren (DE); Ludger Ronge, Eriskirch (DE); Loren C. Dreier, Vass, NC (US); Robert A. Sayman, Laurinburg, NC (US); Ronald P. Muetzel, Friedrichshafen (DE); Muneer AbuSamra, Southern Pines, NC (US)

(73) Assignee: ZF Meritor LLC, Maxton, NC (US)

( * ) Notice: Subject to any disclaimer, the term of this patent is extended or adjusted under 35 U.S.C. 154(b) by 0 days.

(21) Appl. No.: 10/701,269

(22) Filed: Nov. 4, 2003

(65) Prior Publication Data
US 2005/0096181 A1    May 5, 2005

(51) Int. Cl.[7] ........................ B60K 41/02; G06F 17/00; G06F 19/00
(52) U.S. Cl. ........................ 477/175; 477/70; 477/180; 701/67
(58) Field of Search ........................... 477/70, 90, 175, 477/180, 900, 901, 902; 701/67, 68, 51

(56) References Cited

U.S. PATENT DOCUMENTS

| | | | |
|---|---|---|---|
| 4,476,745 A | 10/1984 | Moan | |
| 5,655,996 A | 8/1997 | Ohtsuka | |
| 5,916,062 A * | 6/1999 | Siepker | 477/194 |
| 6,049,751 A | 4/2000 | Palmer | |
| 6,148,975 A | 11/2000 | Shih | |
| 6,167,996 B1 | 1/2001 | Huber | |
| 6,346,064 B1 * | 2/2002 | Hada et al. | 477/171 |
| 6,463,821 B1 * | 10/2002 | Reed et al. | 74/330 |
| 6,502,027 B2 * | 12/2002 | Saotome et al. | 701/67 |
| 6,561,948 B2 | 5/2003 | Markyvech | |
| 6,662,095 B1 * | 12/2003 | Habeck | 701/51 |
| 2002/0094899 A1 * | 7/2002 | Hamai | 475/5 |

* cited by examiner

Primary Examiner—Tisha Lewis
(74) Attorney, Agent, or Firm—Carlson, Gaskey & Olds

(57) ABSTRACT

A vehicle transmission system includes a transmission component that has an engaged condition where torque can be transferred from a vehicle engine to a drive component, and a non-engaged condition where torque is prohibited from being transferred to the drive component. A controller generates control signals to control whether the transmission component is in the engaged or non-engaged condition. The controller also identifies when a vehicle start maneuver is a coast start based on vehicle conditions existing just prior to or during the vehicle start maneuver. When a coast start is identified, the controller generates a control signal to either disengage the transmission component or to maintain the transmission component in the non-engaged condition until engine speed generally matches transmission component speed. The controller can directly control engagement by automatically actuating a movable transmission member or can indirectly control engagement by controlling engine speed. Once engine speed and transmission component speed are generally within a common speed range during coasting, the transmission component is engaged.

38 Claims, 1 Drawing Sheet

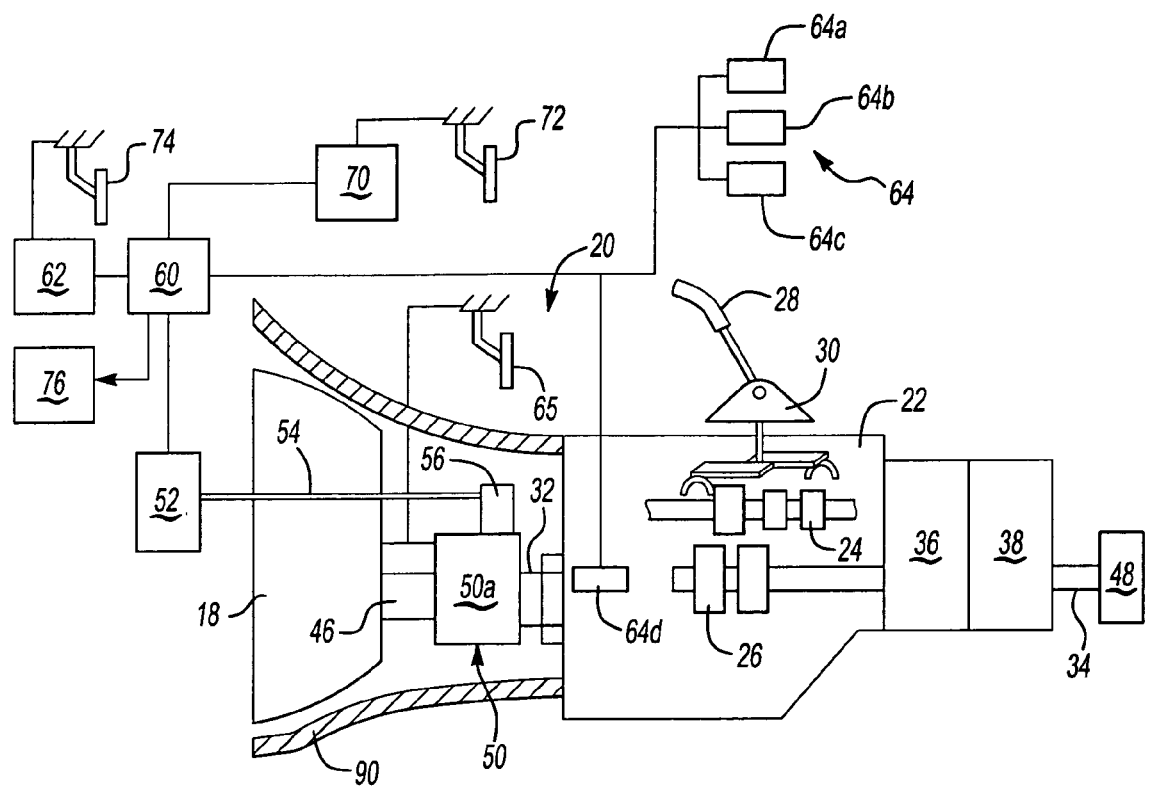
Fig-1
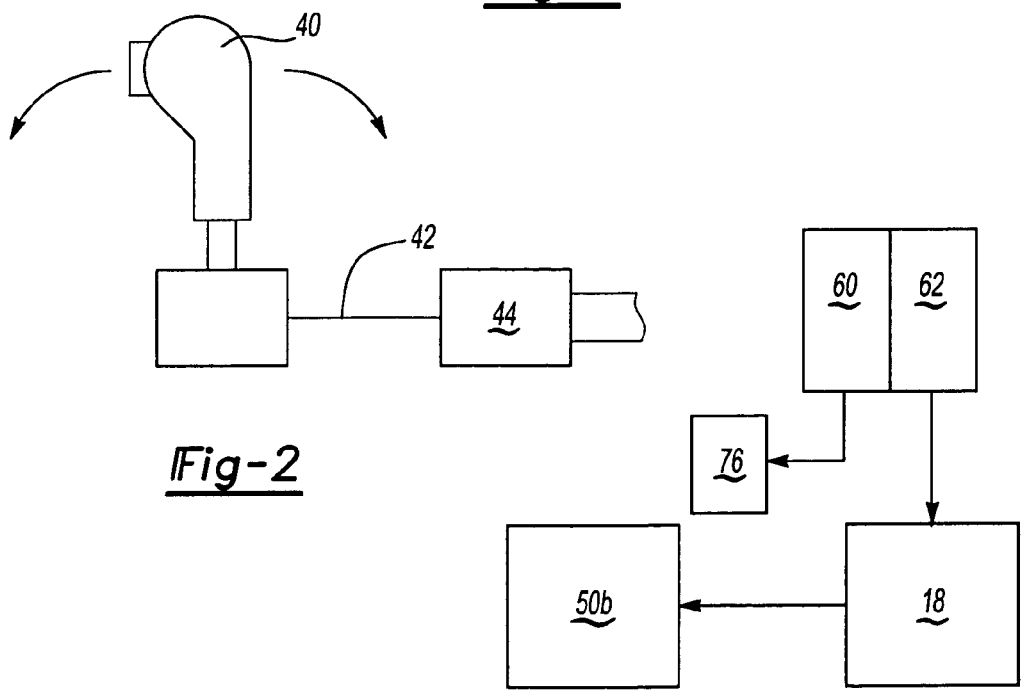
Fig-2
Fig-3

VEHICLE TRANSMISSION SYSTEM WITH COAST CONTROLS

BACKGROUND OF THE INVENTION

This application generally relates to vehicle transmissions. More particularly, this invention relates to a transmission system that predicts and identifies coast starts, and which directly or indirectly controls clutch operation under coast conditions.

A variety of vehicle transmissions are available currently in the market. Some transmissions are automated and do not require operator input other than selecting a gear mode, for example, reverse or drive. Other transmissions are manual and require manual operation of a gear shift lever to manually move transmission components into selected gear ratios. Manual transmissions typically require manual actuation of a clutch pedal to eliminate the connection between an engine output shaft and an input shaft of the transmission. Manual clutch pedal actuation is typically required each time that a shift in gears is desired.

More recently, suppliers and vehicle manufactures have been attempting to simplify the operation of manual transmissions. Even with such improvements, those skilled in the art are always striving to make transmission systems operate more efficiently and to provide a smoother, more comfortable ride. One problem that has not been addressed relates to vehicles experiencing a coast start. This typically occurs when a vehicle, such as a heavy duty truck, is stopped on an incline and the vehicle gains speed without requiring a vehicle operator to depress a vehicle throttle pedal. In order for clutch to be moved into an engaged position, the engine output shaft and transmission input shaft speeds should be very close to each other. Typically, during a coasting condition, once the input shaft speed has exceeded a predetermined speed threshold, the engine revolutions per minute (RPM) are increased so that the clutch can be engaged. The system typically does not take into consideration other vehicle operating factors such as vehicle speed, engine speed, etc., before taking action to engage the clutch. Thus, the engine speed may be increased and the clutch engaged during unfavorable conditions. This is undesirable because due to the sudden closure or engagement of the clutch, there is a surge in the drivetrain. This can cause overloading or shock loading of certain drivetrain components, resulting in premature wear or failure.

Another problem with coast starting concerns gear ratios. The transmission system does not adjust the transmission gear ratio in response to a coast start. This can result in a harsh or abrupt transition as the clutch is moved into the engaged position, causing discomfort to vehicle occupants.

While it is desirable to have a closed driveline, i.e. an engaged driveline, at all times at speed unless a shifting operation is taking place, there are certain operating conditions in which it is desirable to have an open driveline, i.e. a non-engaged driveline. The subject invention provides a control system and method that determines when a vehicle is experiencing a coast start, and which engages or disengages a transmission component as needed to achieve smooth and efficient vehicle transmission operation.

SUMMARY OF THE INVENTION

A vehicle transmission system includes a transmission component that operates in an engaged position or a non-engaged position. In the engaged position, torque is transferred from a vehicle engine to a drive component. In the non-engaged position, torque is prohibited from being transferred to the drive component. A controller generates control signals to directly or indirectly control whether the transmission component operates in the engaged or non-engaged position. The controller also predicts and/or determines when a vehicle start maneuver is a coast start based on vehicle conditions existing just prior to or during the vehicle start maneuver. When a coast start is identified, the controller generates a control signal to either disengage the transmission component or to maintain the transmission component in the non-engaged position until engine speed generally matches transmission component speed. Optionally, the controller can indirectly control transmission component engagement/disengagement by controlling engine speed. Once engine speed and transmission component speed are generally within a common speed range during coasting, the transmission component is automatically engaged.

In one disclosed embodiment, the transmission component comprises a clutch that operably couples a transmission input shaft to the vehicle engine. A clutch actuator selectively moves the clutch between the engaged and non-engaged positions. The clutch actuator can be an automated actuator or a mechanical centrifugal clutch actuator. At least one sensor assembly is used to measure at least one vehicle condition during the vehicle start maneuver. The sensor assembly is operational during both the engaged and non-engaged conditions and is capable of measuring drive component speed, input shaft speed, engine speed, transmission ratio, vehicle weight, vehicle inclination angle, and/or determining prior driving conditions and driver demands. The controller uses this information to identify a coast start. The controller generates a control signal to directly or indirectly control the clutch actuator to change operation of the clutch to the non-engaged position or to maintain the clutch in the non-engaged condition once the coast start is identified.

In one disclosed embodiment, the controller monitors two conditions. The first condition is when the vehicle speed exceeds a speed condition where the input shaft speed rises above engine idle speed during the coast start. The second condition is when the input shaft speed rises above the speed required to engage the clutch. This second condition will always be higher than the first in order to allow clutch disengagement at rest. The controller may have several responses to this condition with similar end results. One method would be to generate a control signal to match the engine speed once the first criteria was met, and allow the clutch to naturally close once that speed met the second criteria. An alternate method would be to wait for the input shaft speed to meet the second criteria, and then generate the control signal to raise the engine to that point, also closing the clutch.

In another disclosed embodiment, the controller identifies a coast direction. The controller also determines whether or not the transmission is engaged, and if so, determines a transmission gear engagement direction. The controller takes action if the coast direction is different than the transmission gear engagement direction. Thus, if the transmission gear is engaged to drive the vehicle forward, and the vehicle starts to coast backwards down an incline, the controller will either visually or audibly warn the vehicle operator and/or will initiate a command to stop or slow the vehicle. For example, the controller could actuate the main vehicle braking system or could partially engage the clutch to provide tactile feedback to the driver.

Thus, the subject invention provides more efficient transmission control during coast starts. These and other features of the present invention can be best understood from the following specification and drawings, the following of which is a brief description.

BRIEF DESCRIPTION OF THE DRAWINGS

FIG. 1 is a schematic diagram of one embodiment of a transmission incorporating the subject invention.

FIG. 2 is a schematic diagram of an electronic shift transmission incorporating the subject invention.

FIG. 3 is a schematic diagram of a mechanical centrifugal clutch as used with the transmission of FIG. 1.

DETAILED DESCRIPTION OF THE PREFERRED EMBODIMENT

FIG. 1 diagrammatically illustrates an engine 18 and a transmission system 20 including a main gear box 22 that has a plurality of gear members 24 and 26. In the illustrated embodiment, a manually operable shift lever 28 is moveable about a pivot point 30 to manually, selectively engage one of the gear members 24 and 26 to achieve a desired gear ratio between a transmission input shaft 32 and a transmission output shaft 34.

The transmission system 20 can include a splitter gear assembly 36 to provide additional gear ratios between the ratios provided by gear members 24, 26 in the main gear box 22, or a range gear box 38 to provide additional gear ratios greater than the ratios provided by gear members 24, 26. The operation of range gear boxes 38 and splitter assemblies 36 are well known in the art and will not be discussed in detail. In some instances the use of a range gear box 38 or a splitter assembly 36 may not be necessary.

Additionally (as schematically illustrated in FIG. 2), this invention is applicable to transmissions having a shift lever 40 that generates electrical signals 42 indicating a desired gear, the signals 42 being communicated to an automated gear moving mechanism 44 that automatically moves the gear members into a position to achieve the desired gear ratio indicated by the generated electrical signal 42. The manual shift lever is illustrated but not required for implementing this invention.

The transmission input shaft 32 receives a driving force from an engine output shaft 46, which is operably coupled to the engine 18. The transmission output shaft 34 provides a driving force to a vehicle drive assembly 48. The drive assembly 48 typically comprises a vehicle driveshaft coupled to a drive axle assembly that includes a center differential, which drives a pair of axis shafts coupled to a pair of vehicle wheel ends.

The transmission input shaft 32 is coupled to the engine output shaft 46 through a clutch 50. The clutch 50 can be a "dry clutch" or a "wet clutch" as is generally known in the art. The clutch 50 can also be a centrifugal clutch, releaser clutch, or any other known clutch mechanism.

In one example, the transmission system 20 includes a clutch 50a with an automated clutch operator 52 having a moving member 54 that operates a clutch engagement member 56. The clutch engagement member 56 moves the clutch 50 between a non-engaged position and an engaged position. In the non-engaged position, driving torque is prohibited from being transferred from the engine output shaft 46 to the transmission input shaft 32. In the engaged position, driving torque is transferred from the engine output shaft 46 to the transmission input shaft 32.

The automated clutch operator 52 can be electrically powered (including a solenoid, for example), hydraulically powered, or pneumatically powered depending on the desired clutch configuration. Automated clutch actuators are known in the art and those skilled in the art will be able to choose from among known components to realize an automated clutch operator 52 that operates as described in this specification.

In another example, shown in FIG. 3, the clutch 50 comprises a fully mechanical centrifugal clutch 50b. As known, the centrifugal clutch 50b utilizes a centrifugal activation force to engage the clutch. The structure and operation of mechanical centrifugal clutches are well-known in the art, and thus will not be discussed in detail.

In either example, the clutch 50 utilizes a controller 60 to directly or indirectly control clutch engagement. In the example shown in FIG. 1, the electronic controller 60 directly controls the operation of the automated clutch operator 52. The electronic controller 60 preferably communicates with an engine controller 62, to gather information regarding the operating condition of the vehicle engine. The electronic controller 60 and engine controller 62 can be any commercially available microprocessor programmed to function as needed to achieve the results of this invention. Engine controllers are well known in the art. Although the controllers 60 and 62 are schematically illustrated as separate devices, they both can be portions of a single microprocessor.

In the example shown in FIG. 3, the controller 60 indirectly controls clutch engagement by controlling the speed of the engine 18 via the engine controller 62. As discussed above, the controller 60 can be separate from the engine controller 62 or can be combined into the engine controller 62 to form a single control unit.

In either configuration, the electronic controller 60 also preferably communicates with a sensor assembly, shown generally at 64, which monitors and measures a plurality of vehicle conditions. The electronic controller 60 gathers information from the sensor assembly 64 to determine whether a vehicle start maneuver is a coast start. A coast start occurs in a situation where a vehicle is in drive or reverse at a standstill on an incline. The vehicle operator releases wheel brakes 70 by releasing a vehicle brake pedal 72, and the vehicle beings to roll down the incline. The vehicle operator does not depress an accelerator or throttle pedal 74, so traditional vehicle start criteria is not present. Thus, the vehicle start maneuver under these conditions comprises a coasting start.

Under this condition, it is desirable to close or engage the clutch 50 to provide a closed drive train as vehicle speed increases. In one disclosed embodiment, the controller 60 monitors vehicle speed, input shaft speed, and/or engine idle speed. Once the vehicle exceeds the point at which the input shaft speed matches the engine idle speed, the controller 60 generates a command for the engine speed to match the input shaft speed. Once the engine speed and input shaft speeds match each other within a common predetermined speed range, the clutch 50 can be engaged without causing discomfort due to mismatch between engine and input shaft speeds.

Further, the controller 60 identifies a situation where the vehicle is coasting in a direction that is different than the engaged gear direction. For example, this situation occurs if the transmission system 20 is in drive with a forward gear engaged, but is rolling backwards, down an incline. If the clutch 50 is engaged in this situation, the result is uncomfortable and can possibly damage system components. To address this problem, the controller 60 determines a coast direction and compares it to an engaged transmission gear direction if the clutch 50 is engaged. If the coast direction is different than the engaged gear direction, the controller 60 takes action. The controller 60 could warn the vehicle operator or could automatically initiate an alternative action.

The controller 60 could warn the operator that this undesirable condition is present by using any type of visual or audible warning device 76, including displays, warning lights, or buzzers, for example. Further, the controller 60 could also inform the vehicle operator when the vehicle is coasting in the correct direction at idle speed.

Optionally, the controller could take action by applying the vehicle wheel brakes 70, or by partially engaging the clutch 50 to immediately stop the vehicle, as soon as the controller 60 identifies differing coast and engaged gear directions. When the vehicle is moving, the clutch torque will oscillate at the drivetrain natural frequency corresponding to that torque level. This will make it uncomfortable for the vehicle operator, and will cause the operator to correct the condition. Optionally, the clutch 50 could be engaged so that only a very small portion of torque is transferred, but not enough to cause damage or discomfort. This small amount of torque will be sufficient to produce driveline and/or cab vibrations that will provide tactile feedback to the operator.

In order to predict or determine whether the vehicle start maneuver is a coast start, the controller analyzes data from the vehicle sensor assembly 64. The sensor assembly 64 preferably includes a plurality of sensors 64a, 64b, 64c, 64d, etc., which measure a variety of vehicle conditions. These conditions can include static or stationary vehicle conditions, such as vehicle weight or vehicle inclination angle, for example, or can include vehicle operating conditions. The vehicle operating conditions could include drive axle component speed, wheel speed, engine output speed, operator demand, transmission ratio, driving conditions occurring prior to coast start, and/or driving resistance. Once a coast start is identified, the controller 60 automatically adjusts the transmission ratio accordingly to provide a smooth transition as the clutch 50 is engaged.

In one disclosed embodiment, when the vehicle is operating in a coast start, the controller moves or maintains the clutch 50 the non-engaged position to accommodate any adjustment in ratios. This allows the engine to rev or speed up to approach the input shaft speed. Once the engine speed output shaft speed matches or is close to the transmission input shaft speed, the clutch 50 can be engaged.

This method could also apply to the splitter assembly 36 or range gear box 38. Once a coast start was identified, the controller 60 would move or maintain the splitter assembly 36 and/or range gear box 38 in neutral position until the respective shaft speeds were synchronized with each other. Once the respective shafts are within a common speed range to each other, the controller could move the splitter assembly 36 and/or range gear box 38 into an engaged position.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle transmission system comprising:
   a transmission component operable in a non-engaged condition or an engaged condition where driving torque from an engine is transferred to a drive component;
   at least one sensor assembly for measuring at least one vehicle condition prior to initiation of a vehicle start maneuver, said sensor assembly being operational during both said engaged and non-engaged conditions; and
   a controller that determines whether said vehicle start maneuver is a coast start based on said vehicle condition and generates a control signal causing said transmission component to operate in said non-engaged position or causing said transmission component to maintain said non-engaged condition once said coast start is identified.

2. The system of claim 1 wherein said start maneuver comprises a release of a vehicle brake member.

3. The system of claim 1 wherein said at least one vehicle condition comprises a static vehicle condition.

4. The system of claim 3 wherein said static vehicle condition includes at least one of vehicle weight or vehicle inclination angle.

5. The system of claim 1 wherein said at least one vehicle condition comprises a vehicle operating condition.

6. The system of claim 5 wherein said vehicle operating condition includes at least one of wheel speed, transmission component output speed, or transmission ratio.

7. The system of claim 1 wherein said transmission component comprises a clutch.

8. The system of claim 7 wherein said controller directly controls said clutch by automatically actuating a movable clutch member that operates a clutch engagement member.

9. The system of claim 7 wherein said controller comprises an engine controller that indirectly controls engagement of said clutch by controlling engine speed.

10. The system of claim 1 wherein said transmission component comprises a range gear box.

11. The system of claim 1 wherein said transmission component comprises a splitter.

12. The system of claim 1 wherein said controller monitors and compares engine speed to transmission component speed during the coast start, and moves the transmission component into said engaged condition when the engine and transmission speeds are both within a common predetermined speed range.

13. The system of claim 12 wherein said controller automatically adjusts a transmission ratio prior to moving the transmission component into said engaged position and subsequently to said coast start.

14. The system of claim 12 wherein said controller automatically initiates a warning to indicate a coast direction that is different than an engaged transmission component direction.

15. A vehicle transmission system comprising:
   a main gear box having an input shaft adapted to receive a driving input torque from an engine and an output shaft adapted to transfer said driving input torque to a drive component;
   a clutch defining an engaged condition where said input shaft is coupled to the engine and a non-engaged condition where said input shaft is uncoupled from the engine;
   at least one sensor assembly for measuring at least one vehicle condition during a vehicle start maneuver, said sensor assembly being operational during both said engaged and non-engaged conditions; and
   a controller that identifies whether said vehicle start maneuver is a coast start based on said vehicle condition and generates a control signal causing said clutch to operate in said non-engaged condition or maintain said non-engaged condition once said coast start is identified.

16. The system of claim 15 wherein said controller directly controls said clutch by automatically actuating a movable clutch member that operates a clutch engagement member.

17. The system of claim 15 wherein said controller comprises an engine controller that indirectly controls engagement of said clutch by controlling engine speed.

18. The system of claim 15 wherein said controller monitors input shaft speed during said coast start and prevents operation of said clutch in said engaged condition until engine speed matches input shaft speed.

19. The system of claim 15 wherein said controller determines if vehicle speed exceeds a speed condition where input shaft speed matches engine idle speed during said coast start, generates a first subsequent control signal to command engine speed to match input shaft speed once said controller identifies that vehicle speed exceeds said speed condition where input shaft speed matches engine idle speed, and generates a second subsequent control signal to engage said clutch when engine speed matches input shaft speed.

20. The system of claim 15 wherein said at least one sensor assembly comprises a plurality of sensor assemblies and wherein said at least one vehicle condition comprises a plurality of vehicle conditions, said controller identifying said coast start based on a plurality of vehicle conditions.

21. The system of claim 15 wherein said vehicle condition comprises vehicle inclination angle.

22. The system of claim 15 wherein said vehicle condition comprises at least one of wheel speed, drive component speed, or input shaft speed.

23. The system of claim 15 wherein said vehicle condition comprises at least one of a transmission ratio or prior driving condition.

24. The system of claim 15 wherein said controller determines an engaged transmission gear direction when said clutch is in said engaged condition, identifies a coast direction if said vehicle start maneuver is determined to be a coast start, and automatically notifies a vehicle operator if said coast direction is different than said engaged transmission gear direction.

25. The system of claim 24 wherein said controller generates a visual or audible warning if said coast direction is different than said engaged transmission gear direction.

26. The system of claim 24 wherein said controller generates a brake signal to automatically apply vehicle service brakes if said coast direction is different than said engaged transmission gear direction.

27. The system of claim 24 wherein said controller generates a clutch signal to at least partially engage said clutch if said coast direction is different than said engaged transmission gear direction to provide tactile feedback to an operator indicating said coast direction is different than said engaged transmission gear direction.

28. A method for controlling a vehicle transmission that includes an input shaft adapted to receive a driving force from an engine, an output shaft adapted to transfer torque to a drive component, and a clutch that selectively couples the input shaft to the engine to define an engaged position, comprising the steps of:
 (a) measuring at least one vehicle condition prior to or during initiation of a vehicle start maneuver;
 (b) identifying whether the vehicle start maneuver is a coast start based on the vehicle condition; and
 (c) generating a control signal causing the clutch to operate in a non-engaged position or causing the clutch to remain in a non-engaged position if the vehicle start maneuver is a coast start.

29. The method of claim 28 wherein step (c) further includes maintaining the clutch in the non-engaged position until a predetermined condition is satisfied.

30. The method of claim 29 wherein the predetermined condition comprises engine and input shaft speeds both being within a common predetermined speed range.

31. The method of claim 30 wherein step (a) further includes measuring at least one of drive component speed, input shaft speed, transmission ratio, or prior driving condition as the vehicle condition.

32. The method of claim 31 including the step of (d) adjusting a transmission ratio once a coast start is identified to provide a smooth engagement transition.

33. The method of claim 31 including the steps of measuring input shaft speed, measuring engine speed, and engaging the clutch when the input shaft speed approximately matches the engine speed.

34. The method of claim 31 including the steps of measuring vehicle speed, measuring input shaft speed, determining if vehicle speed exceeds a speed condition defined as input shaft speed approximately matching engine idle speed, commanding engine speed to approximately match input shaft speed if the vehicle speed exceeds the speed condition, and engaging the clutch when the input shaft speed approximately matches the engine speed.

35. The method of claim 30 wherein at least one vehicle condition comprises a plurality of vehicle conditions and step (a) further includes measuring drive component speed, input shaft speed, transmission ratio, or prior driving condition as the vehicle conditions.

36. The method of claim 28 including the steps of determining a coast direction once the coast start is identified, determining an engaged transmission gear direction if the clutch is engaged, and automatically warning a vehicle operator if the coast direction is different than the engaged transmission gear direction.

37. The method of claim 28 including the step of directly controlling the clutch by automatically generating the control signal to actuate a movable clutch member operably coupled to a clutch engagement member.

38. The method of claim 28 including the step of indirectly controlling clutch engagement by controlling engine speed.

* * * * *